United States Patent [19]
McBiles

[11] Patent Number: 4,562,415

[45] Date of Patent: Dec. 31, 1985

[54] UNIVERSAL ULTRA-PRECISION PSK MODULATOR WITH TIME MULTIPLEXED MODES OF VARYING MODULATION TYPES

[75] Inventor: Carol D. McBiles, Paradise Valley, Ariz.

[73] Assignee: Motorola, Inc., Schaumburg, Ill.

[21] Appl. No.: 623,688

[22] Filed: Jun. 22, 1984

[51] Int. Cl.[4] .................. H03K 07/00; H03C 03/00; H04L 27/20

[52] U.S. Cl. .................. 332/9 R; 332/16 R; 332/21; 332/23 R; 375/52; 375/67

[58] Field of Search .............. 332/9 R, 16 R, 19, 21, 332/23 R; 375/52, 53, 54, 55, 56, 57, 67

[56] References Cited

U.S. PATENT DOCUMENTS

| | | | |
|---|---|---|---|
| 3,619,501 | 6/1970 | Nussbaumer | 375/53 |
| 3,699,479 | 10/1972 | Thompson et al. | 332/16 R |
| 3,781,706 | 12/1973 | Osborne et al. | 332/16 R X |
| 4,174,505 | 11/1979 | Querry | 332/16 R X |
| 4,206,423 | 6/1980 | Nossen | 332/16 R X |
| 4,206,424 | 6/1980 | Nossen | 332/16 R X |
| 4,216,542 | 8/1980 | Hermesmeyer | 375/54 X |
| 4,471,328 | 9/1984 | Chapman | 332/9 R |

FOREIGN PATENT DOCUMENTS 1281169 7/1972 United Kingdom ............ 375/54

Primary Examiner—Eugene R. LaRoche
Assistant Examiner—D. C. Mis
Attorney, Agent, or Firm—Raymond J. Warren

[57] ABSTRACT

An apparatus and method is disclosed which provides PSK modulation utilizing a single balance mixer. This apparatus allows the selection of any type of PSK modulation for each burst of data transmitted through the apparatus. This apparatus further provides a signal having little or no amplitude modulation and reduces the spectrum occupancy to reduce cross channel interference.

20 Claims, 2 Drawing Figures

UNIVERSAL ULTRA-PRECISION PSK MODULATOR WITH TIME MULTIPLEXED MODES OF VARYING MODULATION TYPES

BACKGROUND OF THE INVENTION

1. Field of the Invention

This invention relates, in general, to phase shift keyed (PSK) modulators and, more particularly, to a universal ultra-precision PSK modulator.

2. Description of the Background

Historically PSK modulators have been fabricated from multiple summers, balanced mixers and precision hybrid phase shifters. These types of PSK modulators are subject to amplitude modulation and phase imbalance which is accumulated and compounded through each device.

SUMMARY OF THE INVENTION

Accordingly, it is an object of the present invention to provide an apparatus and method of modulating a signal which uses a single balanced mixer.

A further object of the present invention is to provide an apparatus and method with a constant envelope having little or no amplitude modulation.

Still another object of the present invention is to provide an apparatus and method which reduces the spectrum occupancy to reduce cross channel interference.

Yet another object of the present invention is to provide an apparatus and method of controlling the rate of change in phase by the number of clock pulses per time over a bit period.

The above and other objects and advantages of the present invention are provided by an apparatus and method of modulating a data signal using a single balanced mixer with a constant output envelope and having reduced spectrum occupancy.

A particular embodiment of the present invention comprises an apparatus and method of modulating PSK signals which include, inter alia, BPSK, DPSK, QPSK, offset QPSK, differential QPSK, and EPSK. This is accomplished by using a first divider and filter circuit to provide a carrier signal to a single mixer and a second divider controlled by a logic circuit to provide the data to be modulated with the carrier signal. This control circuit allows the selection between the various types of PSK modulation stated above.

BRIEF DISCUSSION OF THE DRAWING

DETAILED DESCRIPTION OF THE INVENTION

Figure 1:
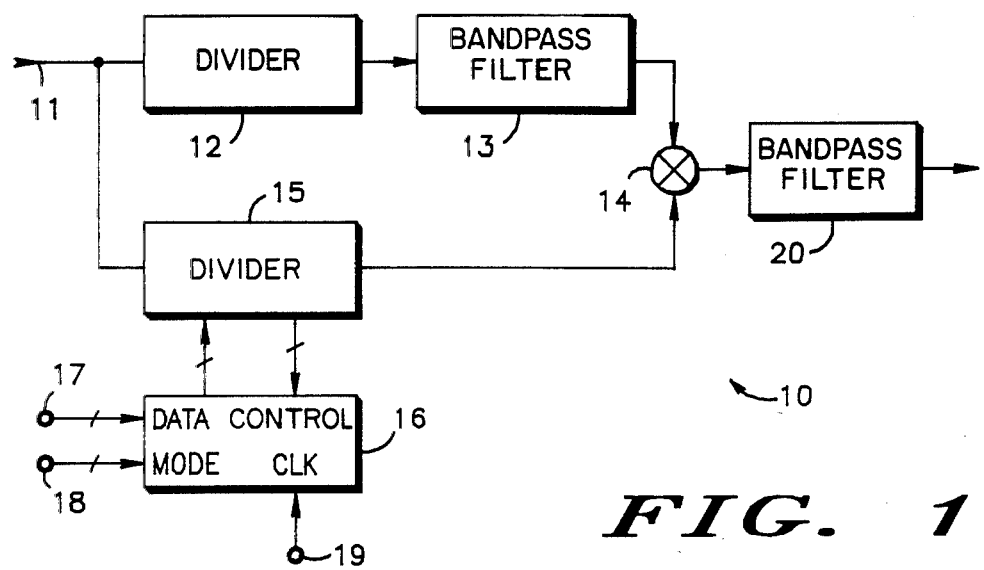
FIG. 1 is a block diagram of a modulator embodying the present invention.

Referring to FIG. 1 a block diagram of a modulator, generally designated 10, is illustrated. Modulator 10 receives a carrier signal $f_0$ at a node 11. Signal $f_0$ is transmitted to a divide-by M circuit 12 where M is defined by $2^n = M$ where n is an integer greater than or equal to 1. This produces a square wave signal, A, of M phase steps defined by the equation, $$A = f_0/M. \tag{1}$$

Signal A is then transmitted to a bandpass filter 13 which is tuned to a center frequency of, $$\text{center frequency} = (M-1)f_0/M. \tag{2}$$

The output, B, of filter 13 is defined by equation, $$B = \cos\left[\frac{2\pi(M-1)f_0 t}{M}\right] \tag{3}$$

and is transmitted to one input of a balanced mixer 14. Carrier signal $f_0$ is also transmitted to a second divider 15 which is presettable and controlled by a control logic circuit 16. Control logic circuit 16 receives a data signal from a node 17; a mode selection signal from a node 18; and a clock signal from a node 19. The signal, C, produced by divider 15 is defined by the equation, $$C = \sin\left[\frac{2\pi f_0 t}{M} + \phi\right] \tag{4}$$

where $\phi$ is defined by $2\pi K/M$ and K is a constant over a bit/symbol time in the range of 0 to $M-1$. Signal C is then provided to the second input of mixer 14 and a signal D is produced which is defined by the equation $$D = \cos\left[\frac{2\pi(M-1)f_0 t}{M}\right]\sin\left[\frac{2\pi f_0 t}{M} + \phi\right] \tag{5}$$

$$= \frac{1}{2}\sin[2\pi f_0 t + \phi] + \frac{1}{2}\sin\left[\frac{2\pi(M-2)f_0 t}{M} - \phi\right]$$

Signal D is next transmitted to a phase locked bandpass filter 20 which produces the final modulated signal E defined by, $$E = \sin\left[2\pi f_0 t + \frac{2\pi k}{M}\right]. \tag{6}$$

Modulator 10 operates by providing M precision phases of modulation on a carrier signal to mixer 14 by using divider 12 and filter 13. Next, the data signal to be modulated is provided from divider 15. The data signal is produced by providing the original data to control logic circuit 16 from node 17. Control circuit 16 then receives a mode selection signal from node 18. The mode selection signal is used to dictate what type of PSK signal is to be implemented. Using these two signals control circuit 16 determines what the correct phase of signal C should be. Next, control circuit 16 looks to divider 15 to see what the phase of the existing signal $f_0$ is. Using the phase of the existing signal and the phase as it should be, control circuit 16 determines the phase shift required to produce signal C. Control circuit 16 then sets divider 15 to produce signal C with the proper phase shift. Signal C is transmitted to mixer 14 where it is combined with signal B to form signal D. Bandpass filter 20 then receives signal D and removes the $(M-2)/M$ fractional component of $f_0$ and produces signal E.

The constant K is set synchronously with the subcarrier clock at every bit or symbol time period to produce the desired PSK signal.

This circuit is capable of functioning in time division multiplex systems where the division is changed from burst to burst of the data being transmitted. This allows both rate and modulation changes of the transmitted data.

This type of circuit results in little or no amplitude modulation which is a function of, and inversely proportional to, the division ratio M. Therefore, the larger the division ratio M the less the amplitude modulation.

Signal E is produced having reduced sidebands which aids in eliminating the cross channel interference that is becoming more of a problem as more channels are used.

Figure 2:
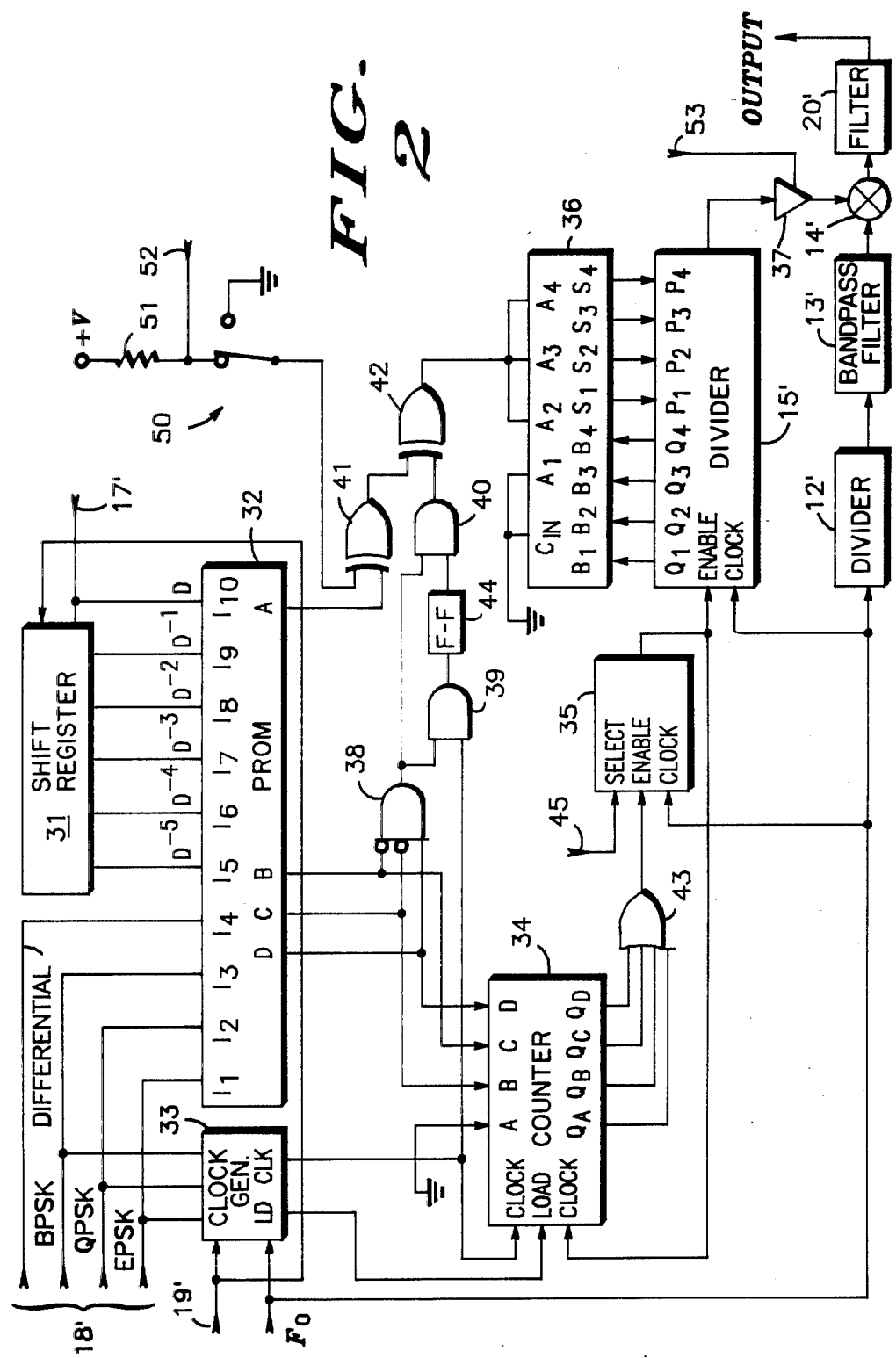
FIG. 2 is a more detailed block diagram of the modulator of FIG. 1.

Referring now to FIG. 2 a more detailed block diagram of a modulator, generally designated 30, embodying the present invention is illustrated. Modulator 30 consists of a node 11' coupled to receive a carrier signal $f_0$; a divide-by-sixteen circuit 12'; a bandpass filter 13'; a balanced mixer 14'; a counter 15'; a node 17' coupled to receive a serial data input (as opposed to a parallel input being illustrated in FIG. 1); a parallel bus 18' coupled to provide a mode selection signal; and a node 19' coupled to receive a data clock signal. The preceding elements are equivalent to the correspondingly numbered elements illustrated in FIG. 1.

Modulator 30 further consists of a shift register 31; a programmable read only memory (PROM) 32; a bit/symbol clock generator 33; a phase magnitude counter 34; a phase rate counter 35; a full adder 36; a presetable divider 37; AND gates 38, 39 and 40; exclusive-OR gates 41 and 42; OR gate 43; and flip-flop 44.

FIG. 2 illustrates a modulator having a 4.8 MHz carrier signal, $f_o$, at node 11' which is input to clock generator 33, divide-by-sixteen 12', phase rate counter 34, and counter 15'. Counter 15' as illustrated here operates as a divide-by-sixteen to provide a subcarrier signal having a frequency of 300 kHz ($f_o/16$) to driver 37. Counter 15' provides the phase steps in 22.5° increments (360°/16) that are synchronized to the 4.8 MHz carrier.

Modulator 30 is capable of operating as a Bi-phase shift keyed modulator (BPSK); a Quadra-phase shift keyed modulator (QPSK); and an Eight-phase shift keyed modulator (EPSK) as illustrated on the modulator selection lines 18'. An additional mode available is the differentially encoded mode of each of the previous three modes, these are designated DBPSK, DQPSK and DEPSK. It is to be noted that these are offered by way of example and other forms of phase shift keyed modulation may be used. In addition, the number of lines available for mode selection is not limited to four as illustrated here.

Mode select lines 18' are coupled to clock generator 33 and to PROM 32. A node 45 is coupled to receive a symbol rate select signal and provides this signal to counter 35 which selects a symbol rate of either 19.2 or 9.6 kilo bits per second (or kilo symbols per second). The division ratio in phase rate counter 35 of eight or sixteen was selected in this example to provide a maximum phase change of 180° within one-quarter of a bit/symbol time. Depending upon the division ratio the rate of change of phase can be instantaneous to a practical upper limit of one-half a symbol time. Each of the six available modulation types can operate at either 19.2 on 9.6 KBPS (KSPS) giving a total of twelve different modulation rates which are listed below with the corresponding input bit rates and output bit/symbol rates.

TABLE 1

| Input Bit Rate | Modulation Type | Output Bit/Baud Rate |
|---|---|---|
| 9.6 KBPS | BPSK | 9.6 KBPS |
| 9.6 KBPS | DBPSK | 9.6 KBPS |
| 19.2 KBPS | QPSK | 9.6 KSPS |
| 19.2 KBPS | DQPSK | 9.6 KSPS |
| 28.8 KBPS | EPSK | 9.6 KSPS |
| 28.8 KBPS | DEPSK | 9.6 KSPS |
| 19.2 KBPS | BPSK | 19.2 KBPS |
| 19.2 KBPS | DBPSK | 19.2 KBPS |
| 38.4 KBPS | QPSK | 19.2 KSPS |
| 38.4 KBPS | DQPSK | 19.2 KSPS |
| 57.6 KBPS | EPSK | 19.2 KSPS |
| 57.6 KBPS | DEPSK | 19.2 KSPS |

Serial data is input from node 17' to shift register 31. It is to be noted that data maybe input in parallel if register 31 is repeated with a three-;bit latch and eliminate the need for clock generator 33. The output of shift register 31 is input to a portion of the address lines of PROM 32. Line D represents the present bit; $D^{-1}$ represents the bit previous to D; and $D^{-2}$ represents the bit previous to $D^{-1}$. This continues on to $D^{-5}$ which is the bit previous to $D^{-4}$. The four modulation selection selection lines, 18', are also input to a portion of PROM 32's address lines. PROM 32 utilizes the input to the address lines to map the incoming bit patterns into a phase "sign" bit A and three magnitude bits B,C, and D. Below is the phase map of the PROM output for various serial inputs from shift register 31.

TABLE 2

| Serial Input | | | | | | PROM Output Code | | | | Phase Change Desired DEGREES |
|---|---|---|---|---|---|---|---|---|---|---|
| D | $D^{-1}$ | $D^{-2}$ | $D^{-3}$ | $D^{-4}$ | $D^{-5}$ | A | B | C | D | |
| BPSK MODULATION | | | | | | | | | | |
| 0 | 0 | X | X | X | X | 0 | 0 | 0 | 0 | 0 |
| 1 | 0 | X | X | X | X | 1 | 0 | 0 | 1 | +180 |
| 1 | 1 | X | X | X | X | 0 | 0 | 0 | 0 | 0 |
| 0 | 1 | X | X | X | X | 1 | 0 | 0 | 1 | +180 |
| DBPSK MODULATION | | | | | | | | | | |
| 0 | X | X | X | X | X | 0 | 0 | 0 | 0 | 0 |
| 1 | X | X | X | X | X | 1 | 0 | 0 | 1 | +180 |
| QPSK MODULATION | | | | | | | | | | |
| 0 | 0 | 0 | 0 | X | X | 0 | 0 | 0 | 0 | 0 |
| 0 | 1 | 0 | 0 | X | X | 0 | 0 | 1 | 1 | −90 |
| 1 | 1 | 0 | 0 | X | X | 1 | 0 | 0 | 1 | +180 |
| 1 | 0 | 0 | 0 | X | X | 1 | 0 | 1 | 1 | +90 |
| 0 | 0 | 0 | 1 | X | X | 1 | 0 | 1 | 1 | +90 |
| 0 | 1 | 0 | 1 | X | X | 0 | 0 | 0 | 0 | 0 |
| 1 | 1 | 0 | 1 | X | X | 0 | 0 | 1 | 1 | −90 |
| 1 | 0 | 0 | 1 | X | X | 1 | 0 | 0 | 1 | +180 |
| 0 | 0 | 1 | 1 | X | X | 1 | 0 | 0 | 1 | +180 |
| 0 | 1 | 1 | 1 | X | X | 1 | 0 | 1 | 1 | +90 |
| 1 | 1 | 1 | 1 | X | X | 0 | 0 | 0 | 0 | 0 |
| 1 | 0 | 1 | 1 | X | X | 0 | 0 | 1 | 1 | −90 |
| 0 | 0 | 1 | 0 | X | X | 0 | 0 | 1 | 1 | −90 |
| 0 | 1 | 1 | 0 | X | X | 1 | 0 | 0 | 1 | +180 |
| 1 | 1 | 1 | 0 | X | X | 1 | 0 | 1 | 1 | +90 |
| 1 | 0 | 1 | 0 | X | X | 0 | 0 | 0 | 0 | 0 |
| DQPSK MODULATION | | | | | | | | | | |
| 0 | 0 | X | X | X | X | 0 | 0 | 0 | 0 | 0 |
| 0 | 1 | X | X | X | X | 0 | 0 | 1 | 1 | −90 |
| 1 | 1 | X | X | X | X | 1 | 0 | 0 | 1 | +180 |
| 1 | 0 | X | X | X | X | 1 | 0 | 1 | 1 | +90 |
| EPSK MODULATION | | | | | | | | | | |
| 0 | 0 | 0 | 0 | 0 | 0 | 0 | 0 | 0 | 0 | 0 |
| 0 | 0 | 1 | 0 | 0 | 0 | 1 | 1 | 1 | 1 | +45 |
| 0 | 1 | 0 | 0 | 0 | 0 | 1 | 0 | 1 | 1 | +90 |
| 0 | 1 | 1 | 0 | 0 | 0 | 1 | 1 | 0 | 1 | +135 |
| 1 | 1 | 1 | 0 | 0 | 0 | 1 | 0 | 0 | 1 | +180 |
| 1 | 1 | 0 | 0 | 0 | 0 | 0 | 1 | 0 | 1 | −135 |
| 1 | 0 | 1 | 0 | 0 | 0 | 0 | 0 | 1 | 1 | −90 |
| 1 | 0 | 0 | 0 | 0 | 0 | 0 | 1 | 1 | 1 | −45 |

TABLE 2-continued

| Serial Input | | | | | | PROM Output Code | | | | Phase Change Desired DE-GREES |
|---|---|---|---|---|---|---|---|---|---|---|
| D | D$^{-1}$ | D$^{-2}$ | D$^{-3}$ | D$^{-4}$ | D$^{-5}$ | A | B | C | D | |
| 0 | 0 | 0 | 0 | 0 | 1 | 0 | 1 | 1 | 1 | −45 |
| 0 | 0 | 1 | 0 | 0 | 1 | 0 | 0 | 0 | 0 | 0 |
| 0 | 1 | 0 | 0 | 0 | 1 | 1 | 1 | 1 | 1 | +45 |
| 0 | 1 | 1 | 0 | 0 | 1 | 1 | 0 | 1 | 1 | +90 |
| 1 | 1 | 1 | 0 | 0 | 1 | 1 | 1 | 0 | 1 | +135 |
| 1 | 1 | 0 | 0 | 0 | 1 | 1 | 0 | 0 | 1 | +180 |
| 1 | 0 | 1 | 0 | 0 | 1 | 0 | 1 | 0 | 1 | −135 |
| 1 | 0 | 0 | 0 | 0 | 1 | 0 | 0 | 1 | 1 | −90 |
| 0 | 0 | 0 | 0 | 1 | 0 | 0 | 0 | 1 | 1 | −90 |
| 0 | 0 | 1 | 0 | 1 | 0 | 0 | 1 | 1 | 1 | −45 |
| 0 | 1 | 0 | 1 | 1 | 0 | 0 | 0 | 0 | 0 | 0 |
| 0 | 1 | 1 | 0 | 1 | 0 | 1 | 1 | 1 | 1 | +45 |
| 1 | 1 | 1 | 0 | 1 | 0 | 1 | 0 | 1 | 1 | +90 |
| 1 | 1 | 0 | 0 | 1 | 0 | 1 | 1 | 0 | 1 | +135 |
| 1 | 0 | 1 | 0 | 1 | 0 | 1 | 0 | 0 | 1 | +180 |
| 1 | 0 | 0 | 0 | 1 | 0 | 0 | 1 | 0 | 1 | −135 |
| 0 | 0 | 0 | 0 | 1 | 1 | 0 | 1 | 0 | 1 | −135 |
| 0 | 0 | 1 | 0 | 1 | 1 | 0 | 0 | 1 | 1 | −90 |
| 0 | 1 | 0 | 0 | 1 | 1 | 0 | 1 | 1 | 1 | −45 |
| 0 | 1 | 1 | 0 | 1 | 1 | 0 | 0 | 0 | 0 | 0 |
| 1 | 1 | 1 | 0 | 1 | 1 | 1 | 1 | 1 | 1 | +45 |
| 1 | 1 | 0 | 0 | 1 | 1 | 1 | 0 | 1 | 1 | +90 |
| 1 | 0 | 1 | 0 | 1 | 1 | 1 | 1 | 0 | 1 | +135 |
| 1 | 0 | 0 | 0 | 1 | 1 | 1 | 0 | 0 | 1 | +180 |
| 0 | 0 | 1 | 1 | 1 | 1 | 1 | 0 | 0 | 1 | +180 |
| 0 | 0 | 1 | 1 | 1 | 1 | 0 | 1 | 0 | 1 | −135 |
| 0 | 1 | 0 | 1 | 1 | 1 | 0 | 0 | 1 | 1 | −90 |
| 0 | 1 | 1 | 1 | 1 | 1 | 0 | 1 | 1 | 1 | −45 |
| 1 | 1 | 1 | 1 | 1 | 1 | 0 | 0 | 0 | 0 | 0 |
| 1 | 1 | 0 | 1 | 1 | 1 | 1 | 1 | 1 | 1 | +45 |
| 1 | 0 | 1 | 1 | 1 | 1 | 1 | 0 | 1 | 1 | +90 |
| 1 | 0 | 0 | 1 | 1 | 1 | 1 | 1 | 0 | 1 | +135 |
| 0 | 0 | 0 | 1 | 1 | 0 | 1 | 1 | 0 | 1 | +135 |
| 0 | 1 | 1 | 1 | 1 | 0 | 1 | 0 | 0 | 1 | +180 |
| 0 | 1 | 0 | 1 | 1 | 0 | 0 | 1 | 0 | 1 | −135 |
| 0 | 1 | 1 | 1 | 1 | 0 | 0 | 0 | 1 | 1 | −90 |
| 1 | 1 | 1 | 1 | 1 | 0 | 0 | 1 | 1 | 1 | −45 |
| 1 | 1 | 0 | 1 | 1 | 0 | 0 | 0 | 0 | 0 | 0 |
| 1 | 0 | 1 | 1 | 1 | 0 | 1 | 1 | 1 | 1 | +45 |
| 1 | 0 | 0 | 1 | 1 | 0 | 1 | 0 | 1 | 1 | +90 |
| 0 | 0 | 0 | 1 | 0 | 1 | 1 | 0 | 1 | 1 | +90 |
| 0 | 0 | 1 | 1 | 0 | 1 | 1 | 1 | 0 | 1 | +135 |
| 0 | 1 | 0 | 1 | 0 | 1 | 1 | 0 | 0 | 1 | +180 |
| 0 | 1 | 1 | 1 | 0 | 1 | 0 | 1 | 0 | 1 | −135 |
| 1 | 1 | 1 | 1 | 0 | 1 | 0 | 0 | 1 | 1 | −90 |
| 1 | 1 | 0 | 1 | 0 | 1 | 0 | 1 | 1 | 1 | −45 |
| 1 | 0 | 1 | 1 | 0 | 1 | 0 | 0 | 0 | 0 | 0 |
| 1 | 0 | 0 | 0 | 0 | 1 | 1 | 1 | 1 | 1 | +45 |
| 0 | 0 | 0 | 0 | 0 | 0 | 1 | 1 | 1 | 1 | +45 |
| 0 | 0 | 1 | 1 | 0 | 0 | 1 | 0 | 1 | 1 | +90 |
| 0 | 1 | 0 | 1 | 0 | 0 | 1 | 1 | 0 | 1 | +135 |
| 0 | 1 | 1 | 1 | 0 | 0 | 1 | 0 | 0 | 1 | +180 |
| 1 | 1 | 1 | 1 | 0 | 0 | 0 | 1 | 0 | 1 | −135 |
| 1 | 1 | 0 | 1 | 0 | 0 | 0 | 0 | 1 | 1 | −90 |
| 1 | 0 | 1 | 1 | 0 | 0 | 0 | 1 | 1 | 1 | −45 |
| 1 | 0 | 0 | 1 | 0 | 0 | 0 | 0 | 0 | 0 | 0 |
| DEPSK MODULATION | | | | | | | | | | |
| 0 | 0 | 0 | X | X | X | 0 | 0 | 0 | 0 | 0 |
| 0 | 0 | 1 | X | X | X | 1 | 1 | 1 | 1 | +45 |
| 0 | 1 | 0 | X | X | X | 1 | 0 | 1 | 1 | +90 |
| 0 | 1 | 1 | X | X | X | 1 | 1 | 0 | 1 | +135 |
| 1 | 1 | 1 | X | X | X | 1 | 0 | 0 | 1 | +180 |
| 1 | 1 | 0 | X | X | X | 0 | 1 | 0 | 1 | −135 |
| 1 | 0 | 1 | X | X | X | 0 | 0 | 1 | 1 | −90 |
| 1 | 0 | 0 | X | X | X | 0 | 1 | 1 | 1 | −45 |

The data clock input at node 19', a square wave at the bit rate, is coupled to clock generator 33 which in turn generates an output load pulse of one bit duration and a clock pulse at the bit/symbol rate. The bit/symbol rate is determined by the mode control lines 18'. If the BPSK mode is selected then a clock pulse is output for every bit; if a QPSK mode is selected then a clock pulse is output for every second bit input; and if an EPSK mode is selected then a pulse is output for every third bit input. The load pulse generated by clock 33 will bracket the bit/symbol clock pulse. The bit/symbol rate is used to control AND gate 39 causing it to sample the PROM output. Output lines B, C and D of PROM 32 are input to OR gate 38, with the B and C inputs being inverted before entering the gate, and to phase magnitude counter 34. The phase information from PROM 32 is loaded into phase magnitude counter 34 on each clock pulse from clock 33. AND gate 38 is set to detect the presence of a 180° phase shift code of 001. The presence of a 180° phase shift is clocked through AND gate 39 by the clock pulse from clock 33 to divide-by-two flip flop 44. The output of flip flop 44 is gated through AND gate 40 to exclusive-OR gate 42. Exclusive-OR gate 42 has a second input received from exclusive-OR gate 41 which is coupled to the sign output "A" of PROM 32. A logic zero from the "A" output of PROM 32 indicates a negative or counter-clockwise phase change (vector rotation), and a logic one indicates a positive or clockwise phase change. The sign output is transmitted to exclusive-OR gate 41 where it is combined with a signal from a switch 50. Switch 50 is a two position switch the first position is coupled to a power supply +V through a resistor 51 and to a node 52 which is coupled to receive an external spectrum control signal. The second position is coupled to ground. Switch 50 is used to invert the sign of the phase change should a spectrum inversion occurs in the transmission medium between the modulator output and the bit synchronizer in the receiver (eg. should the mixing signal be changed from a lowside to a highside signal the direction of rotation should be changed). The signal from switch 50 is then coupled to exclusive-OR gate 41 where it is combined with the sign bit from PROM 32. The output from gate 41 is then transmitted to exclusive-OR gate 42 and combined with the signal from AND gate 39. The purpose of this gating is to alternate the sign of the 180° phase changes every time a 180° change occurs to guarantee a balanced spectrum at the output of modulator 30.

Phase magnitude counter 34 receives the magnitude input from PROM 32, this magnitude input is loaded into phase magnitude counter 34 when the load signal from bit/symbol clock generator 33 enables counter 34 and the load clock signal from clock 33 pulses counter 34 to load the magnitude signal. The digital number loaded into counter 34 is initially presented as the output of the counter. This output is combined in OR gate 43 which provides an enabling signal to phase rate counter 35. Counter 35 has a symbol rate select input coupled to node 45 which has an input of either 19.2 of 9.6 KSPS which selects either a divide-by-eight or a divide-by-sixteen, resp. If the baud rate is 19.2 KSPS the 300 kHz subcarrier will be phase shifted at a rate of 13.5°/usec. If the baud rate is 9.6 KSPS the 300 kHz subcarrier will be phase shifted at a rate of 6.75°/usec. However, the incremental carrier steps remain 22.5°. Counter 35 is clocked by the carrier signal, $f_o$, when enabled. Counter 35 outputs a signal that is transmitted to the clock input of counter 34 which has a width equal to $1/f_o$ sec. Each clock pulse from counter 35 causes the number in counter 34 to increase by one which will continue until counter 34 is reset, or reaches all zeros. When counter 34 is reset all the outputs are set to zero which disables counter 35 and stops clocking counter 34. If the phase magnitude input to counter 34 from PROM 32 is all zeros then when the input is loaded into counter 34 no clock pulses are generated from counter 35 as there is no enabling signal output from counter 34. Phase magnitude counter 34 counts the required number of times to produce the desired phase shift of the 300 kHz subcarrier in 22.5° increments.

The sign output of exclusive-OR gate 42 controls the three most significant bits of adder 36. A logic one, when input to adder 36 indicates a negative phase change of 22.5° and a logic zero indicates a positive phase change of 22.5°. The carry in input and the least significant bit, of adder 36, are hard wired to a logic one. Preset 15' is clocked by the carrier signal, $f_o$, to produce a 300 kHz subcarrier square wave $f_o/16$. If a load enable pulse is present preset 15' will assume the state at it's inputs from adder 36 at the next clock pulse. The number at the inputs to preset 15' is the number in the adder, which is the number input to the adder from exclusive-OR gate 42, plus the number being input to adder 36 from presetable counter 15'. By way of example if a $-22.5°$ phase change were desired a digital 1111 would be input to adder 36 plus a 1 carry bit. This results in a 0000 being in the adder. This number will then be added to the number in preset 15', which will be arbitrarily selected as 1011, to produce an output to preset 15' of 1011+0000 or 1011. Thus, the phase of the 300 kHz subcarrier has been changed $-22.5°$ since the counter has remained at the same state for two clock periods of $f_o$. Another example is to have a $+22.5°$ phase change. For this a logic zero would be output from exclusive-OR 42 thus making the input to adder 36 equivalent to 0001 plus the carry bit of 1 would give 0010. This is then added to the number in preset 15', again 1011, and result in a digital 1101 (0010+1011).

The output of preset divide-by-16 may be represented by $f_o/16 \angle \phi$ and is transmitted to gated amplifier 37 to produce a $\pm V$ drive signal to the IF input to mixer 14'. A carrier control signal is input at a node 53 and coupled to amplifier 37 to control the signal from preset 15' to mixer 14'.

Carrier $f_o$ is divided-by-sixteen in counter 12' to provide a stable reference signal to check the phase shifts of the output of preset 15'. The output from counter 12' is used to drive bandpass filter 13' which is tuned to $(15/16)f_o \angle 0$ where $\angle 0$ is an arbitrary reference angle. The output of filter 13' drives the LO input of mixer 14' which produces a signal $$[((15f_o)/16)\angle 0] \pm [(f_o/16)\angle \phi]$$

The output from mixer 14' is then input to bandpass filter 20' to produce the desired modulated carrier signal $f_o \angle \phi$ where $\angle \phi = 2\pi k/M$ where M is 16 and k is a positive integer in the range defined by $0 - \leq k < M$.

Thus, it is apparent there has been provided, in accordance with the invention, a device and method that fully satisfies the objects, aims, and advantages set forth above.

It has been shown that the present invention provides an apparatus and method of producing a modulated signal using a single balanced mixer producing a constant output envelope and having reduced spectrum occupancy. It has also been shown that this modulator will operate at various and changing types of PSK modulations.

While the invention has been described in conjunction with specific embodiments thereof, it is evident that many alterations, modifications, and variations will be apparent to those skilled in the art in light of the foregoing description. Accordingly, it is intended to embrace all such alternatives, modifications, and variations as fall within the spirit and broad scope of the appended claims.

I claim:

1. A modulator having a carrier signal input, a data input, a mode select input, a clock input and an output, said modulator comprising:
    control means for controlling the type of modulation of said modulator, said control means having a first input, a second input, a third input, a fourth input and an output, said first input being coupled to said carrier signal input of said modulator, said second input being coupled to said data input of said modulator, said third input being coupled to said mode select input of said modulator and said fourth input being coupled to said clock input of said modulator; and
    a mixer having a first input, a second input and an output, said first input being coupled to said carrier signal input of said modulator, said second input being coupled to said output of said control means and said output being coupled to said output of said modulator.

2. The modulator of claim 1 wherein said first input of said mixer is coupled to said carrier signal input of said modulator through carrier modifying means for modifying a carrier signal input to said modulator, said carrier modifying means having an input and an output, said input being coupled to said input of said modulator and said output being coupled to said first input of said mixer.

3. The modulator of claim 2 wherein said carrier modifying means comprises:
    a first divider having an input and an output said input being coupled to said input of said carrier modifiying means; and
    a first filter having an input and an output, said input being coupled to said output of said first divider and said output being coupled to said first input of said mixer.

4. The modulator of claim 3 wherein said first filter comprises a bandpass filter having an input and an output, said input being coupled to said input of said first filter and said output being coupled to said output of said first filter.

5. The modulator of claim 1 wherein said output of said mixer is coupled to said output of said modulator through a second filter having an input and an output, said input being coupled to said output of said mixer and said output being coupled to said output of said modulator.

6. The modulator of claim 5 wherein said second filter comprises a bandpass filter having an input and an output, said input being coupled to said input of said second filter and said output being coupled to said output of said second filter.

7. The modulator of claim 5 wherein said first input of said mixer is coupled to said carrier signal input of said modulator through carrier modifying means for modifying a carrier signal input to said modulator, said carrier modifying means having an input and an output, said input being coupled to said carrier signal input of said modulator and said output being coupled to said first input of said mixer.

8. The modulator of claim 7 wherein said carrier modifying means comprises;

a first divider having an input and an output said input being coupled to said input of said carrier modifiying means; and a first filter having an input and an output, said input being coupled to said output of said first divider and said output being coupled to said first input of said mixer.

9. The modulator of claim 8 wherein said first filter comprises a bandpass filter having an input and an output, said input being coupled to said input of said first filter and said output being coupled to said output of said first filter.

10. The modulator of claim 9 wherein said second filter comprises a bandpass filter having an input and an output, said input being coupled to said input of said second filter and said output being coupled to said output of said second filter.

11. A method of producing a modulated signal comprising the steps of:

providing a carrier signal, a data signal and a mode selection signal;

selecting a desired phase using said data signal and said mode selection signal;

comparing said desired phase to a phase of said carrier signal;

adjusting said phase of said carrier signal to said desired phase producing an adjusted carrier signal;

modifying said carrier signal producing a modified carrier signal;

mixing said adjusted carrier signal with said modified carrier signal producing a mixed signal; and filtering said mixed signal producing said modulated signal.

12. A modulator having a carrier signal input, a data input, a mode select input, a clock input and an output, said modulator comprising:

a first divider having an input and an output, said input being coupled to said carrier signal input of said modulator;

a first filter having an input and an output, said input being coupled to said output of said first divider;

a mixer having a first input, a second input and an output, said first input being coupled to said output of said first filter;

a second divider having a first input, a second input, a first output and a second output, said first input being coupled to said carrier signal input of said modulator and said second output being coupled to said second input of said mixer;

control logic means for controlling the phase shift of a data signal, said control means having a first input, a second input, a third input, a fourth input, and an output, said first input being coupled to said data input of said modulator, said second input being coupled to said mode select input of said modulator, said third input being coupled to said clock input of said modulator, said fourth input being coupled to said first output of said second divider and said output being coupled to said second input of said second divider;

a second filter having an input and an output, said input being coupled to said output of said mixer and said output being coupled to said output of said modulator.

13. The modulator of claim 12 wherein said first filter comprises a bandpass filter having an input and an output said input being coupled to said input of said first filter and said output being coupled to said output of said first filter.

14. The modulator of claim 13 wherein said second filter comprises a bandpass filter having an input and an output, said input being coupled to said input of said second filter and said output being coupled to said output of said second filter.

15. The modulator of claim 14 wherein said first divider comprises a divide-by-M wherein M is defined by $2^n$ and where n is an integer greater than or equal to 1.

16. A modulator having a carrier input, a data input, a data clock input, a mode select input and an output, said modulator comprising:

a shift register having a data input, a clock input and an output, said input being coupled to said data input of said modulator and said clock input being coupled to said data clock input of said modulator;

a programmable read only memory having a first address input, a second address input, a phase magnitude output and a phase sign output, said first address input being coupled to said mode select input of said modulator and said second address input being coupled to said output of said shift register;

a bit/symbol clock generator having an input, a clock input, a carrier input, a load output and a clock output, said input being coupled to said mode select input of said modulator, said clock input being coupled to said data clock input of said modulator and said carrier input being coupled to said carrier input of said modulator;

a first logic gate having an input and an output, said input being coupled to said phase magnitude output of said programmable read only memory;

a second logic gate having first and second inputs and an output, said first input being coupled to said output of said first logic gate and said second input being coupled to said clock output of said bit/symbol clock generator;

a third logic gate having an input and an output, said input being coupled to said output of said second logic gate;

a fourth logic gate having first and second inputs and an output, said first input being coupled to said output of said first logic gate and said second input being coupled to said output of said third logic gate;

a fifth logic gate having first and second inputs and an output, said second input being coupled to said output of said fourth logic gate;

a sixth logic gate having first and second inputs and an output, said second input being coupled to said phase sign output of said programmable read only memory and said output being coupled to said first input of said fifth logic gate;

a switch having first and second positions and an output, said first position being adapted to couple said output to an external spectrum control signal, said second position being adapted to couple said output to a ground and said output being coupled to said first input of said sixth logic gate;

a phase magnitude counter having an input, a load input, a load clock input, a clock input and an output, said input being coupled to said phase magnitude output of said programmable read only memory, said load input being coupled to said load output of said bit/symbol clock generator and said load clock input being coupled to said clock output of said bit/symbol clock generator;

a seventh logic gate having an input and an output, said input being coupled to said output of said phase magnitude counter;

a phase rate counter having a select input, an enable input, a clock input and an output, said select input being coupled to receive a bit/symbol selection signal, said enable input being coupled to said output of said seventh logic gate, said clock input being coupled to said carrier input of said modulator and said output being coupled to said clock input of said phase magnitude counter;

a presettable counter having an enable input, a clock input, a data input and first and second outputs, said enable input being coupled to said output of said phase rate counter and said clock input being coupled to said carrier input of said modulator;

a full adder having first, second and third inputs and an output, said first input being coupled to ground, said second input being coupled to said output of said fifth logic gate, said third input being coupled to said first output of said presettable counter and said output being coupled to said data input of said presettable counter;

a gated amplifier having an input, a control input and an output, said input being coupled to said second output of said presettable counter and said control input being coupled to receive a carrier control signal;

a divider having an input and an output, said input being coupled to said carrier input of said modulator;

a first bandpass amplifier having an input and an output, said input being coupled to said output of said divider;

a balanced mixer having first and second inputs and an output, said first input being coupled to said output of said first bandpass amplifier and said second input being coupled to said output of said gated amplifier; and a second bandpass amplifier having an input and an output, said input being coupled to said output of said balanced mixer and said output being coupled to said output of said modulator.

17. The modulator of claim 16 wherein said first, second and fourth logic gates comprise AND gates.

18. The modulator of claim 17 wherein said third logic gate comprises a flip flop coupled to operate as a divide-by-two.

19. The modulator of claim 18 wherein said fifth and sixth logic gates comprise exclusive-OR gates.

20. The modulator of claim 19 wherein said seventh logic gate comprises an OR gate.

* * * * *